(12) United States Patent
Zones

(10) Patent No.: US 10,155,666 B2
(45) Date of Patent: Dec. 18, 2018

(54) ALUMINUM-SUBSTITUTED MOLECULAR SIEVE CIT-13

(71) Applicant: Chevron U.S.A. Inc., San Ramon, CA (US)

(72) Inventor: Stacey Ian Zones, San Francisco, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 0 days.

(21) Appl. No.: 15/720,046

(22) Filed: Sep. 29, 2017

(65) Prior Publication Data

US 2018/0134571 A1    May 17, 2018

Related U.S. Application Data

(60) Provisional application No. 62/423,232, filed on Nov. 17, 2016.

(51) Int. Cl.
| | |
|---|---|
| *C01B 39/48* | (2006.01) |
| *C01B 39/02* | (2006.01) |
| *C01B 39/06* | (2006.01) |
| *B01J 29/70* | (2006.01) |
| *B01J 29/04* | (2006.01) |

(52) U.S. Cl.
CPC ............ *C01B 39/48* (2013.01); *C01B 39/026* (2013.01); *C01B 39/065* (2013.01); *B01J 29/047* (2013.01); *B01J 29/70* (2013.01)

(58) Field of Classification Search
CPC ...... C01B 39/026; C01B 39/48; B01J 29/047; B01J 29/70
See application file for complete search history.

(56) References Cited

U.S. PATENT DOCUMENTS

| | | | |
|---|---|---|---|
| 2016/0346771 A1* | 12/2016 | Schmidt | .............. B01J 20/10 |
| 2017/0252729 A1* | 9/2017 | Schmidt | .............. B01J 29/047 |

FOREIGN PATENT DOCUMENTS

| | | |
|---|---|---|
| WO | 2016064452 A1 | 4/2016 |
| WO | 2016196533 A1 | 12/2016 |
| WO | 2017152072 A1 | 9/2017 |

OTHER PUBLICATIONS

Gao et al, "A Stable Extra-Large Pore Zeolite with Intersecting 14- and 1-Membered-Ring Channels", Chem Eur J pp. 14367-14372, (Aug. 2016) (Year: 2016).*

B.W. Boal, M.W. Deem, D. Xie, J.H. Kang, M.E. Davis and S.I. Zones "Synthesis of Germanosilicate Molecular Sieves from Mono- and Di-Quaternary Ammonium OSDAs Constructed from Benzyl Imidazolium Derivatives: Stabilization of Large Micropore Volumes Including New Molecular Sieve CIT-13" Chem. Mater. 2016, 28, 2158-2164.

J.H. Kang, D. Xie, S.I. Zones, S. Smeets, L.B. McCusker and M.E. Davis "Synthesis and Characterization of CIT-13, a Germanosilicate Molecular Sieve with Extra-Large Pore Openings" Chem. Mater. 2016, 28, 6250-6259.

(Continued)

*Primary Examiner* — David M Brunsman
(74) *Attorney, Agent, or Firm* — Terrence M. Flaherty

(57) ABSTRACT

Methods are provided for the synthesis of molecular sieve CIT-13 having aluminum incorporated into the framework structure and use of such materials in organic compound conversion and/or sorptive processes.

11 Claims, 2 Drawing Sheets

(56) References Cited

OTHER PUBLICATIONS

T. Moteki and R.F. Lobo "A General Method for Aluminum Incorporation into High-Silica Zeolites Prepared in Fluoride Media" Chem. Mater. 2016, 28, 638-649.
PCT International Search Report, International Patent Appl. No. PCT/US2017/054232, dated Jan. 2, 2018.

\* cited by examiner

ALUMINUM-SUBSTITUTED MOLECULAR SIEVE CIT-13

CROSS-REFERENCE TO RELATED APPLICATIONS

This application claims priority to U.S. Provisional Application Ser. No. 62/423,232, filed on Nov. 17, 2016, the disclosure of which is fully incorporated herein by reference.

TECHNICAL FIELD

This disclosure relates to molecular sieve CIT-13 with aluminum incorporated into the molecular sieve framework structure, its synthesis, and its use in catalytic and/or sorptive processes.

BACKGROUND

Molecular sieve materials, both natural and synthetic, have been demonstrated in the past to be useful as adsorbents and to have catalytic properties for various types of hydrocarbon conversion reactions. Certain molecular sieves, such as zeolites, silicoaluminophosphates, aluminophosphates, and mesoporous materials, are ordered, porous crystalline materials having a definite crystalline structure as determined by X-ray diffraction. Within a crystalline molecular sieve material there are cavities which may be interconnected by channels or pores. These cavities and pores are uniform in size within a specific molecular sieve material. Because the dimensions of these pores are such as to accept for adsorption molecules of certain dimensions while rejecting those of larger dimensions, these materials have come to be known as "molecular sieves" and are utilized in a variety of industrial processes.

B. W. Boal et al. (*Chem. Mater.* 2016, 28, 2158-2164) and J. H. Kang et al. (*Chem. Mater.* 2016, 28, 6250-6259) disclose germanosilicate molecular sieve CIT-13 and its synthesis using a family of monoquaternary benzyl-imidazolium organic structure directing agents. CIT-13 has a two-dimensional pore system possessing intersecting 14- and 10-membered ring pores.

For catalytic applications, incorporation of catalytic active sites, such as aluminum atoms, is important to impart acidic properties to a molecular sieve.

Accordingly, it has now been found that molecular sieve CIT-13 with aluminum incorporated into the molecular sieve framework structure can be directly synthesized from aluminosilicate FAU framework type zeolites.

SUMMARY

In one aspect, there is provided an aluminogermanosilicate molecular sieve having the framework structure of CIT-13.

In another aspect, there is provided a method of synthesizing an aluminogermanosilicate molecular sieve having the structure of CIT-13, the method comprising: (a) providing a reaction mixture comprising: (1) an aluminosilicate FAU framework type zeolite; (2) a source of germanium; (3) a structure directing agent comprising one or more of 1-methyl-3-(3-methylbenzyl)imidazolium cations, 1-methyl-3-(3,5-dimethylbenzyl)imidazolium cations, 1,2-dimethyl-3-(3-methylbenzyl)imidazolium cations, and 1,2-dimethyl-3-(3,5-dimethylbenzyl)imidazolium cations; (4) a source of fluoride ions; and (5) water; and (b) subjecting the reaction mixture to crystallization conditions sufficient to form crystals of the aluminogermanosilicate molecular sieve.

In yet another aspect, there is provided an aluminogermanosilicate molecular sieve having the structure of CIT-13 and, in its as-synthesized form, comprising one or more of 1-methyl-3-(3-methylbenzyl)imidazolium cations, 1-methyl-3-(3,5-dimethylbenzyl)imidazolium cations, 1,2-dimethyl-3-(3-methylbenzyl)imidazolium cations, and 1,2-dimethyl-3-(3,5-dimethylbenzyl)imidazolium cations in its pores.

In a further aspect, there is provided a process for converting a feedstock comprising an organic compound to a conversion product which comprises contacting the feedstock at organic compound conversion conditions with a catalyst comprising an active form of the molecular sieve described herein.

DETAILED DESCRIPTION

Introduction

Figure 1:
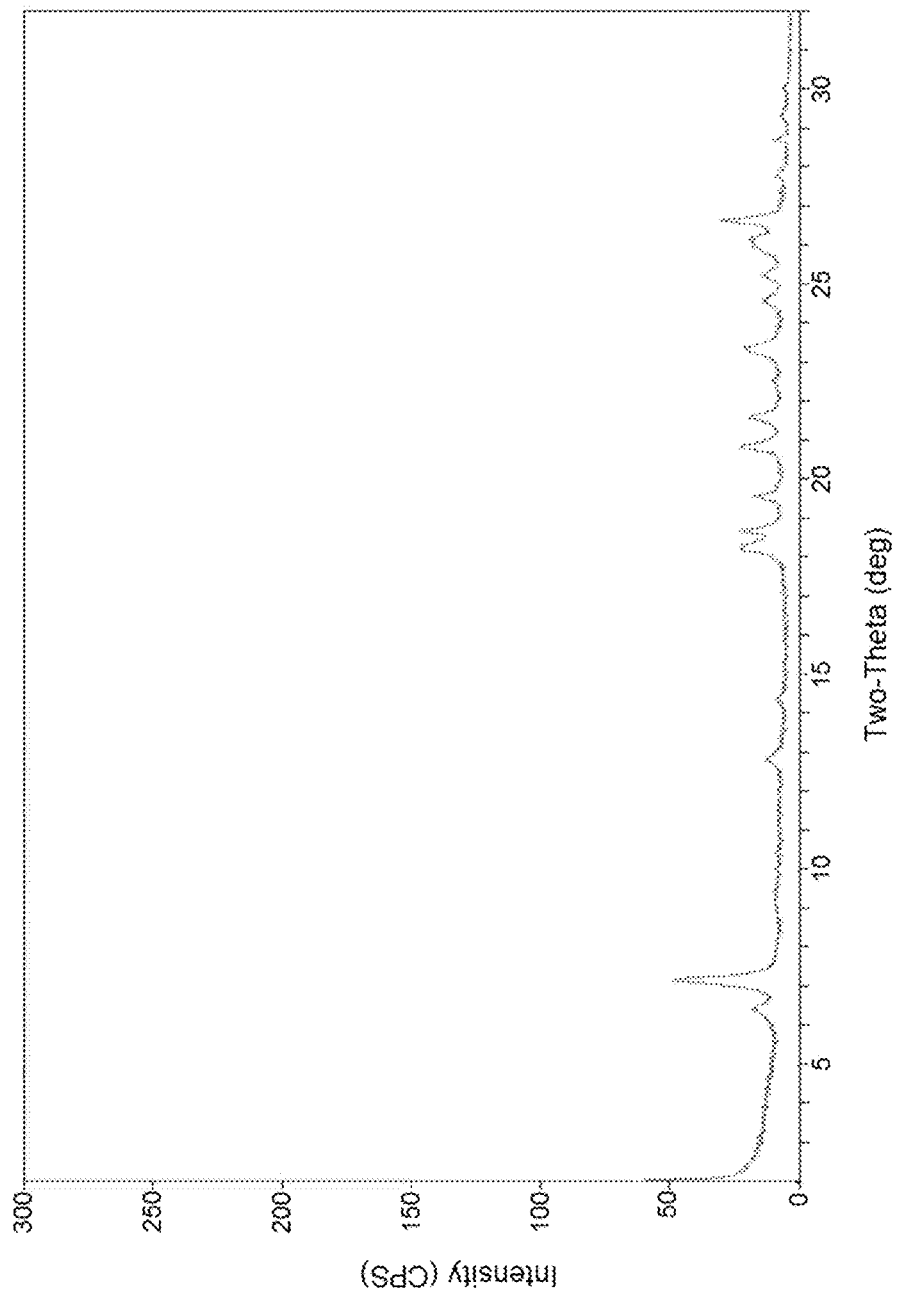
FIG. 1 is a powder X-ray diffraction (XRD) pattern of the as-synthesized molecular sieve prepared in Example 1.
Figure 2:
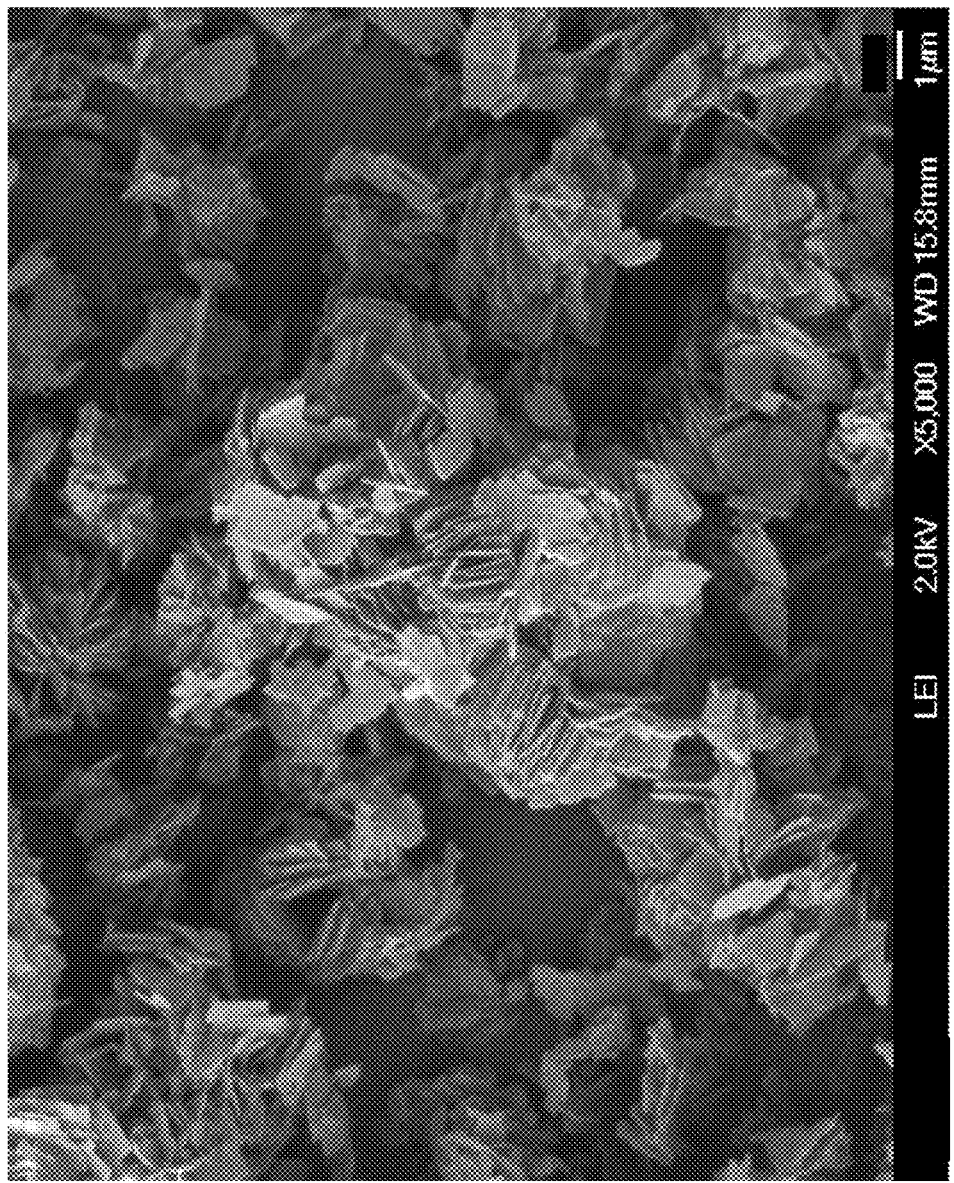
FIG. 2 is a scanning electron micrograph (SEM) image of the as-synthesized molecular sieve prepared in Example 1.

The term "aluminogermanosilicate" refers to a crystalline molecular sieve comprising aluminum, germanium and silicon oxides incorporated into the framework structure of the molecular sieve.

The term "framework type" is used in the sense described in the "*Atlas of Zeolite Framework Types*," Sixth Revised Edition, Elsevier, 2007.

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

As used herein, the numbering scheme for the Periodic Table Groups is as disclosed in *Chem. Eng. News* 1985, 63(5), 26-27.

Reaction Mixture

In general, aluminogermanosilicate molecular sieve CIT-13 ("Al-CIT-13") is synthesized by: (a) providing a reaction mixture comprising: (1) an aluminosilicate FAU framework type zeolite; (2) a source of germanium; (3) a structure directing agent (Q) comprising one or more of 1-methyl-3-(3-methylbenzyl)imidazolium cations, 1-methyl-3-(3,5-dimethylbenzyl)imidazolium cations, 1,2-dimethyl-3-(3-methylbenzyl)imidazolium cations, and 1,2-dimethyl-3-(3,5-dimethylbenzyl)imidazolium cations; (4) a source of fluoride ions; and (5) water; and (b) subjecting the reaction mixture to crystallization conditions sufficient to form crystals of the molecular sieve.

The composition of the reaction mixture from which the molecular sieve is formed, in terms of molar ratios, is identified in Table 1 below:

TABLE 1

| Reactants | Useful | Exemplary |
|---|---|---|
| $(SiO_2 + GeO_2)/Al_2O_3$ | 35 to 500 | 50 to 150 |
| $Q/(SiO_2 + GeO_2)$ | 0.20 to 0.75 | 0.25 to 0.65 |

TABLE 1-continued

| Reactants | Useful | Exemplary |
| --- | --- | --- |
| F/(SiO$_2$ + GeO$_2$) | 0.20 to 0.75 | 0.25 to 0.65 |
| H$_2$O/(SiO$_2$ + GeO$_2$) | 5 to 20 | 5 to 15 | wherein Q is as described herein above.

Suitable aluminosilicate FAU framework type zeolites are available, for example, from Zeolyst International (Conshohocken, Pa.) and Tosoh Corporation (Tokyo, Japan).

The aluminosilicate FAU framework type zeolite may have a SiO$_2$/Al$_2$O$_3$ molar ratio in a range of from 5 to 500 (e.g., 5 to 100, 10 to 500, 10 to 100, 25 to 500, 25 to 100, 50 to 500, or 50 to 100).

Suitable sources of germanium include germanium dioxide, germanium alkoxides (e.g., germanium tetraethoxide), and germanium halides (e.g., GeCl$_4$).

The structure directing agent (Q) can be selected from one or more of 1-methyl-3-(3-methylbenzyl)imidazolium cations, 1-methyl-3-(3,5-dimethylbenzyl)imidazolium cations, 1,2-dimethyl-3-(3-methylbenzyl)imidazolium cations, and 1,2-dimethyl-3-(3,5-dimethylbenzyl)imidazolium cations. These cations are represented by the following structures (1) to (4), respectively:

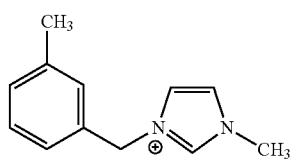

(1) 1-methyl-3-(3-methylbenzyl)imidazolium cation

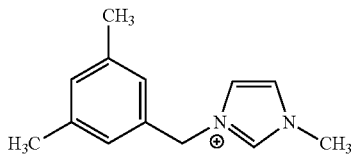

(2) 1-methyl-3-(3,5-dimethylbenzyl)imidazolium cation

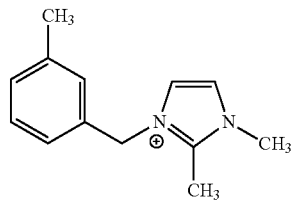

(3) 1,2-dimethyl-3-(3-methylbenzyl)imidazolium cation

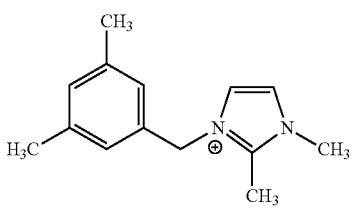

(4) 1,2-dimethyl-3-(3,5-dimethylbenzyl)imidazolium cation

Suitable sources of Q are the hydroxides, chlorides, bromides, and/or other salts of the quaternary ammonium compound.

Suitable sources of fluoride ions include hydrofluoric acid, ammonium fluoride, and ammonium bifluoride.

The reaction mixture may contain seeds of a molecular sieve material, such as CIT-13, desirably in an amount of from 0.01 to 10,000 ppm by weight (e.g., from 100 to 5000 ppm by weight) of the reaction mixture.

For each embodiment described herein, the reaction mixture can be supplied by more than one source. Also, two or more reaction components can be provided by one source.

The reaction mixture can be prepared either batch wise or continuously. Crystal size, morphology and crystallization time of the molecular sieve herein can vary with the nature of the reaction mixture and the crystallization conditions.

Crystallization and Post-Synthesis Treatment

Crystallization of the molecular sieve from the above reaction mixture can be carried out under either static, tumbled or stirred conditions in a suitable reactor vessel, such as for example polypropylene jars or Teflon-lined or stainless steel autoclaves, at a temperature of from 125° C. to 200° C. for a time sufficient for crystallization to occur at the temperature used, e.g., from 5 to 15 days. Crystallization is usually carried out in a closed system under autogenous pressure.

Once the molecular sieve crystals have formed, the solid product is recovered from the reaction mixture by standard mechanical separation techniques such as centrifugation or filtration. The recovered crystals are water-washed and then dried to obtain the as-synthesized molecular sieve crystals. The drying step is typically performed at a temperature of less than 200° C.

As a result of the crystallization process, the recovered crystalline product contains within its pore structure at least a portion of the structure directing agent used in the synthesis.

In its as-synthesized and anhydrous form, aluminogermanosilicate CIT-13 has a chemical composition comprising molar relationship described in Table 2:

TABLE 2

| (SiO$_2$ + GeO$_2$)/Al$_2$O$_3$ | 35 to 500 | 50 to 150 |
| --- | --- | --- |
| Q/(SiO$_2$ + GeO$_2$) | >0 to 0.1 | >0 to 0.1 |
| F/(SiO$_2$ + GeO$_2$) | >0 to 0.1 | >0 to 0.1 | wherein Q is as described herein above.

The Q and F components, which are associated with the as-synthesized material as a result of their presence during crystallization, are easily removed by conventional post-crystallization methods.

The as-synthesized molecular sieve may be subjected to treatment to remove part or all of the structure directing agent used in its synthesis. This is conveniently effected by thermal treatment in which the as-synthesized material is heated at a temperature of at least about 370° C. for at least 1 minute and generally not longer than 20 hours. The thermal treatment can be performed at a temperature up to 925° C. While sub-atmospheric pressure can be employed for the thermal treatment, atmospheric pressure is desired for reasons of convenience. Additionally or alternatively, the structure directing agent can be removed by treatment with ozone (see, e.g., A. N. Parikh et al., *Micropor. Mesopor. Mater.* 2004, 76, 17-22). The organic-free product, especially in its metal, hydrogen and ammonium forms, is particularly useful in the catalysis of certain organic (e.g., hydrocarbon) conversion reactions. In the present disclosure, the organic-free molecular sieve in its hydrogen form is referred to as "active form" of the molecular sieve, with or without metal function present.

In its calcined form, Al-CIT-13 has a chemical composition comprising the following molar relationship:

$$Al_2O_3:(n)(SiO_2+GeO_2)$$

wherein n is in a range of 35 to 500 (e.g., 35 to 250, 35 to 150, 50 to 500, 50 to 250, or 50 to 150).

Any cations in the as-synthesized molecular sieve can be exchanged with other cations in accordance with techniques known in the art. Preferred replacing cations are those which tailor the catalytic activity for certain organic compound conversion reactions. These include hydrogen, rare earth metals and metals of Groups 2 to 15 of the Periodic Table of Elements.

Sorption and Catalysis

Al-CIT-13 can be used as a sorbent or as a catalyst to catalyze a wide variety of organic compound conversion processes including many of present commercial/industrial importance. Examples of organic compound conversion processes effectively catalyzed by Al-CIT-13 by itself or in combination with one or more other catalytically active substances including other crystalline catalysts, can include those requiring a catalyst with acid activity. Examples of organic conversion processes that may be catalyzed by Al-CIT-13 can include, but are not limited to, alkylation, (hydro)cracking, disproportionation, isomerization, and oligomerization.

As in the case of many catalysts, it may be desirable to incorporate Al-CIT-13 with another material resistant to the temperatures and other conditions employed in organic conversion processes. Such materials can include active and inactive materials and synthetic or naturally occurring zeolites, as well as inorganic materials such as clays, silica, and/or metal oxides such as alumina. The latter may be either naturally occurring or in the form of gelatinous precipitates or gels, including mixtures of silica and metal oxides. Use of a material in conjunction with Al-CIT-13, i.e., combined therewith and/or present during synthesis of the molecular sieve, which is active, can tend to change the conversion and/or selectivity of the catalyst in certain organic conversion processes. Inactive materials can suitably serve as diluents to control the amount of conversion in a given process so that products can be obtained in an economic and orderly manner without employing other (more costly) means for controlling the rate of reaction. These materials may be incorporated into naturally occurring clays (e.g., bentonite and kaolin) to improve the crush strength of the catalyst under commercial operating conditions. These materials (i.e., clays, oxides, etc.) can function as binders for the catalyst. It can be desirable to provide a catalyst having good crush strength, because in commercial use it can be desirable to prevent the catalyst from breaking down into powder-like materials (attrition). These clay and/or oxide binders have been employed normally only for the purpose of improving the crush strength of the catalyst.

Naturally occurring clays which can be composited with Al-CIT-13 can include the montmorillonite and kaolin family, which families include the sub-bentonites, and the kaolins commonly known as Dixie, McNamee, Georgia, and Florida clays, or others in which the main mineral constituent is halloysite, kaolinite, dickite, nacrite, or anauxite. Such clays can be used in the raw state as originally mined or initially subjected to calcination, acid treatment, or chemical modification. Binders useful for compositing with Al-CIT-13 can additionally or alternatively include inorganic oxides, such as silica, zirconia, titania, magnesia, beryllia, alumina, and mixtures thereof.

Alternatively or in addition to the foregoing materials, Al-CIT-13 can be composited with a porous matrix material such as silica-alumina, silica-magnesia, silica-zirconia, silica-thoria, silica-beryllia, silica-titania, and/or one or more ternary compositions such as silica-alumina-thoria, silica-alumina-zirconia silica-alumina-magnesia, and silica-magnesia-zirconia.

The relative proportions of Al-CIT-13 and inorganic oxide matrix may vary widely, with the Al-CIT-13 content ranging from 1 to 90 wt. % (e.g., 2 to 80 wt. %) of the composite.

EXAMPLES

The following illustrative examples are intended to be non-limiting.

Example 1

A Teflon liner was charged with 2.5 mmol of 1,2-dimethyl-3-(3-methylbenzyl)imidazolium hydroxide in a 5 mL solution, 0.24 g of CBV-780 Y-zeolite (Zeolyst International, $SiO_2/Al_2O_3$ molar ratio=80), and 0.10 g of $GeO_2$. The mixture was then set in a fume hood and water was allowed to evaporate off until the total reactant solids mass=2.0 g, which corresponded to a $H_2O/(SiO_2+GeO_2)$ molar ratio of 10. Then, seeds of germanosilicate CIT-13 (lacking any aluminum) were added to the mixture followed by 2.5 mmol of concentrated HF. The liner was capped and placed within a Parr steel autoclave reactor. The autoclave was placed in an oven and heated at 170° C. with rotation (43 rpm) for 8-10 days until a product is seen by sampling. The solid products were recovered from the cooled reactor by filtration, washed with deionized water and dried at 95° C.

The resulting as-synthesized product was analyzed by powder XRD and SEM. The powder X-ray diffraction pattern in FIG. 1 is consistent with the product being CIT-13. A SEM image of the as-synthesized product shows a uniform field of crystals having a platy crystal morphology which is consistent for CIT-13.

Two separate product samples were tested by Energy Dispersive X-ray (EDX) analysis for incorporation of aluminum and germanium into the crystals. The results are set forth in Table 3 below.

TABLE 3

| | Sample 1 | | Sample 2 | |
|---|---|---|---|---|
| Element | Wt. % | Atomic % | Wt. % | Atomic % |
| Al | 0.89 | 0.64 | 0.63 | 0.45 |
| Ge | 9.65 | 2.60 | 9.05 | 2.43 |
| Si | 24.23 | 16.90 | 24.35 | 16.87 |

The as-synthesized product was calcined inside a muffle furnace under a flow of 2% oxygen/98% nitrogen heated to 595° C. at a rate of 1° C./minute and held at 595° C. for five hours and cooled to ambient temperature.

The calcined molecular sieve was subjected to a micropore volume analysis using $N_2$ as adsorbate and via the B.E.T. method. The molecular sieve exhibited a micropore volume of 0.145 $cm^3$/g.

Brønsted acidity of the calcined molecular sieve was determined by isopropylamine-temperature-programmed desorption (IPam TPD) adapted from the published descriptions by T. J. Gricus Kofke et al. (*J. Catal.* 1988, 114, 34-45), T. J. Gricus Kofke et al. (*J. Catal.* 1989, 115, 265-272), and J. G. Tittensor et al. (*J. Catal.* 1992, 138, 714-720). A sample was pre-treated at 400° C.-500° C. for 1 hour in flowing dry $H_2$. The dehydrated sample was then cooled down to 120° C. in flowing dry helium and held at 120° C. for 30 minutes in a flowing helium saturated with isopropylamine for adsorption. The isopropylamine-saturated sample was then heated up to 500° C. at a rate of 10° C./minute in flowing dry helium. The Brønsted acidity was calculated based on the weight loss vs. temperature by thermogravimetric analysis (TGA) and effluent $NH_3$ and propene by mass spectrometry. The sample had a Brønsted acidity of 180 μmol/g.

The invention claimed is:

1. A method of synthesizing an aluminogermanosilicate molecular sieve having the structure of CIT-13, the method comprising:
   (a) providing a reaction mixture comprising:
      (1) an aluminosilicate FAU framework type zeolite;
      (2) a source of germanium;
      (3) a structure directing agent (Q) comprising one or more of 1-methyl-3-(3-methylbenzyl)imidazolium cations, 1-methyl-3-(3,5-dimethylbenzyl)imidazolium cations, 1,2-dimethyl-3-(3-methylbenzyl)imidazolium cations, and 1,2-dimethyl-3-(3,5-dimethylbenzyl)imidazolium cations;
      (4) a source of fluoride ions;
      (5) water; and
   (b) subjecting the reaction mixture to crystallization conditions sufficient to form crystals of the aluminogermanosilicate molecular sieve.

2. The method of claim 1, wherein the reaction mixture has a composition, in terms of molar ratios, as follows:

| | |
|---|---|
| $(SiO_2 + GeO_2)/Al_2O_3$ | 35 to 500 |
| $Q/(SiO_2 + GeO_2)$ | 0.20 to 0.75 |
| $F/(SiO_2 + GeO_2)$ | 0.20 to 0.75 |
| $H_2O/(SiO_2 + GeO_2)$ | 5 to 20. |

3. The method of claim 1, wherein the reaction mixture has a composition, in terms of molar ratios, as follows:

| | |
|---|---|
| $(SiO_2 + GeO_2)/Al_2O_3$ | 50 to 150 |
| $Q/(SiO_2 + GeO_2)$ | 0.25 to 0.65 |
| $F/(SiO_2 + GeO_2)$ | 0.25 to 0.65 |
| $H_2O/(SiO_2 + GeO_2)$ | 5 to 15. |

4. The method of claim 1, wherein the reaction mixture also contains seeds of a molecular sieve material having the structure of CIT-13.

5. The method of claim 4, wherein the reaction mixture comprises from 0.01 ppm by weight to 10,000 ppm by weight of seeds.

6. The method of claim 1, wherein the crystallization conditions include a temperature of from 125° C. to 200° C.

7. An aluminogermanosilicate molecular sieve having a framework structure of CIT-13 and, in its as-synthesized form, comprising one or more of 1-methyl-3-(3-methylbenzyl)imidazolium cations, 1-methyl-3-(3,5-dimethylbenzyl) imidazolium cations, 1,2-dimethyl-3-(3-methylbenzyl)imidazolium cations, and 1,2-dimethyl-3-(3,5-dimethylbenzyl) imidazolium cations in its pores.

8. An aluminogermanosilicate molecular sieve synthesized by the method of claim 1.

9. The crystalline molecular sieve of claim 7, having a composition, in terms of molar ratios, as follows:

| | |
|---|---|
| $(SiO_2 + GeO_2)/Al_2O_3$ | 50 to 150 |
| $Q/(SiO_2 + GeO_2)$ | >0 to 0.1 |
| $F/(SiO_2 + GeO_2)$ | >0 to 0.1 | wherein Q is selected from one or more of 1-methyl-3-(3-methylbenzyl)imidazolium cations, 1-methyl-3-(3,5-dimethylbenzyl)imidazolium cations, 1,2-dimethyl-3-(3-methylbenzyl)imidazolium cations, and 1,2-dimethyl-3-(3,5-dimethylbenzyl)imidazolium cations.

10. The aluminogermanosilicate molecular sieve of claim 7, having a composition, in terms of mole ratios, as follows:

| | |
|---|---|
| $(SiO_2 + GeO_2)/Al_2O_3$ | 35 to 500 |
| $Q/(SiO_2 + GeO_2)$ | >0 to 0.1 |
| $F/(SiO_2 + GeO_2)$ | >0 to 0.1 | wherein Q is selected from one or more of 1-methyl-3-(3-methylbenzyl)imidazolium cations, 1-methyl-3-(3,5-dimethylbenzyl)imidazolium cations, 1,2-dimethyl-3-(3-methylbenzyl)imidazolium cations, and 1,2-dimethyl-3-(3,5-dimethylbenzyl)imidazolium cations.

11. A process for converting a feedstock comprising an organic compound to a conversion product, the process comprising contacting the feedstock with a catalyst at organic compound conversion conditions, the catalyst comprising an active form of the crystalline molecular sieve of claim 8.

\* \* \* \* \*